Oct. 30, 1934.  P. GAISER  1,978,746
THERMOMETER
Filed March 20, 1930
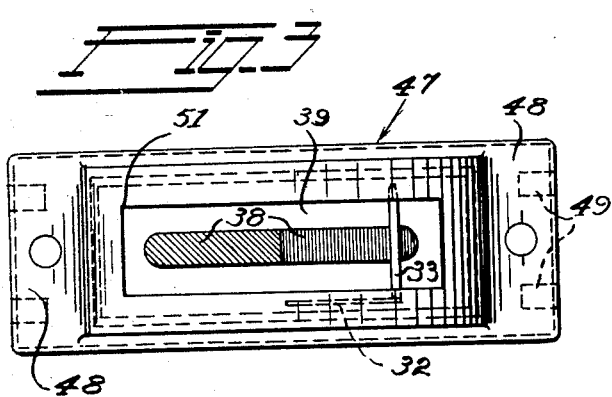
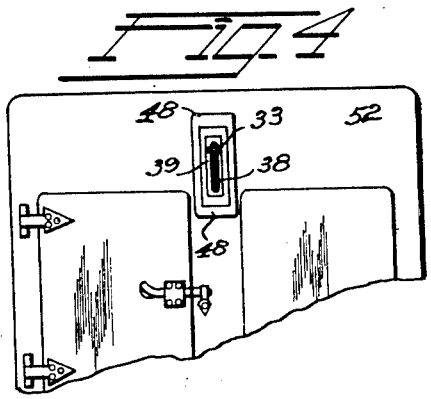
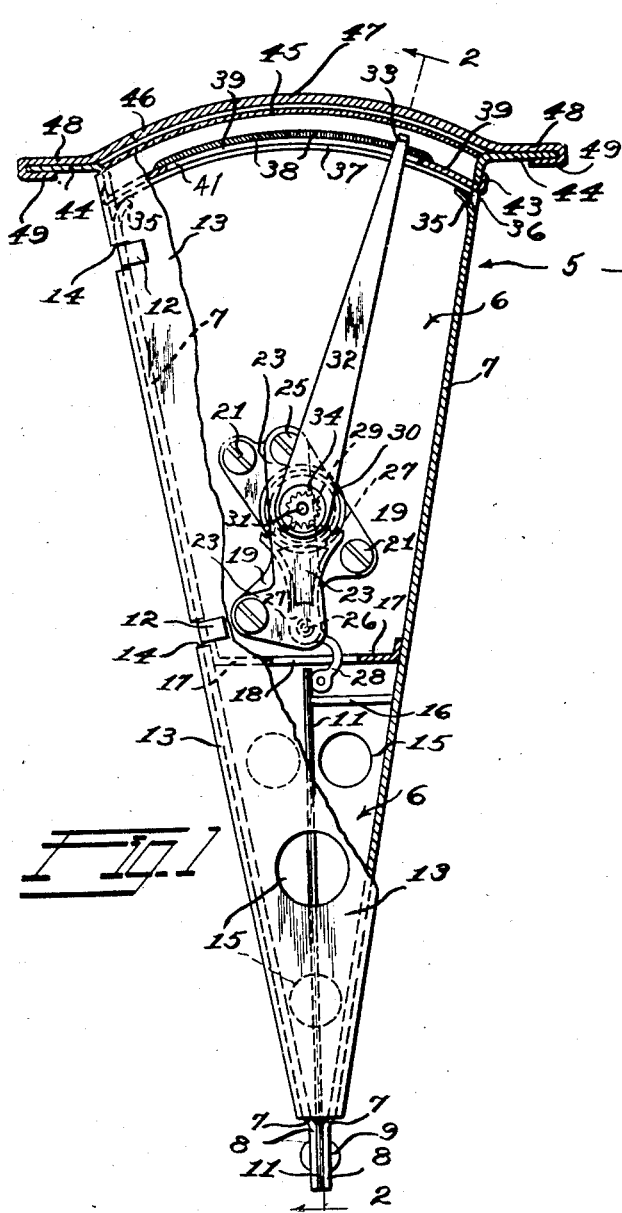
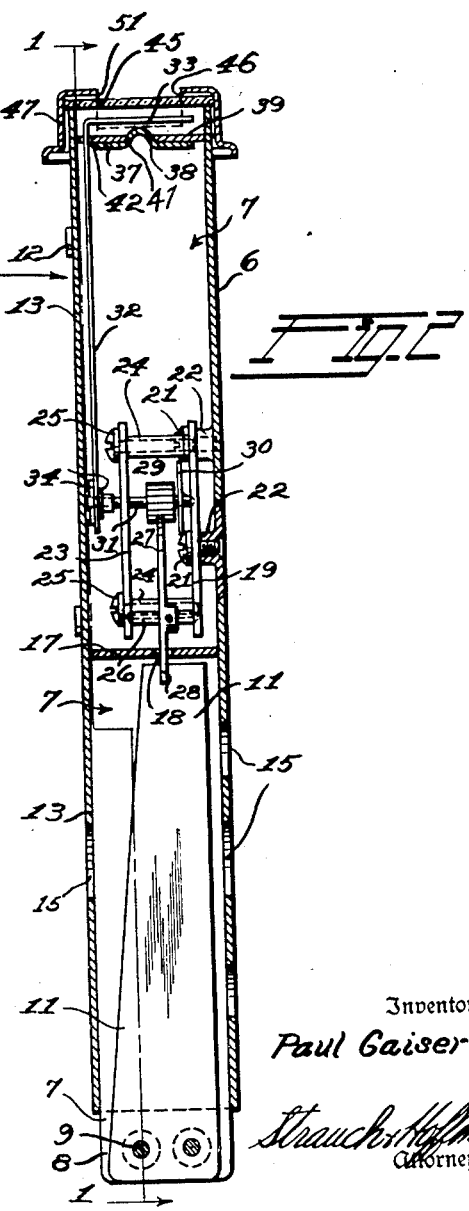
Inventor
Paul Gaiser
Strauch + Hoffman
Attorneys Patented Oct. 30, 1934

1,978,746

UNITED STATES PATENT OFFICE 1,978,746

THERMOMETER

Paul Gaiser, Sellersville, Pa., assignor to United States Gauge Company, New York, N. Y., a corporation of Pennsylvania Application March 20, 1930, Serial No. 437,444

9 Claims. (Cl. 73—118)

This invention relates to thermometers of the type wherein a temperature-responsive element causes the mechanical actuation of a means for indicating temperature conditions throughout a predetermined range. More specifically, the invention relates to that type of instrument in which a mechanical movement is disposed in a different chamber than that from which the temperature conditions are observed as, for example, a thermometer housing within the interior of a refrigerator and readable from without the latter.

It is a primary object of this invention to provide a thermometer of the above type which shall be compact and inexpensive to manufacture, and yet thoroughly reliable and accurate in operation.

Another major object of the present invention is to design a thermometer having a mechanically operable indicator so actuated as to be positively moved to register a visible danger or warning signal whenever the temperature approaches or reaches an undesirable value.

A further object is to provide a thermometer having a mechanical movement one element of which is arranged to separably abut and follow a temperature-responsive bi-metallic element.

Another important object of this invention lies in the provision of an indicator suspended with a tendency to swing downwardly to a point determined by the position of a bi-metallic element. In this connection, it is an object to equip the indicator with a pointer that is always horizontal as it swings vertically in parallelism with the axis of oscillation of the complete indicator.

A still further object of my invention resides in the provision of an instrument having a simple movement supported by a special framework to insure the retention of all movable elements in their proper relative positions and thus assure a smooth and unbinding working during operation thereof.

Other objects are to provide an improved indicator-actuating mechanism, and a compact and inexpensive housing therefor; and further objects will become apparent from the following detailed description.

In the accompanying drawing:

Figure 1 is a longitudinal sectional view of a preferred form of my invention, taken substantially along the plane of line 1—1, Figure 2, with a portion of the casing cover shown in elevation.

Figure 2 is another longitudinal sectional view, taken at right angles to that of Figure 1 substantially along an irregular line 2—2, Figure 1.

Figure 3 constitutes an elevational view of the indicating or dialed face of the instrument of Figures 1 and 2.

Figure 4 shows, in partial front elevation, a refrigerator having the illustrated device of this invention applied thereto.

With further reference to the drawing, in which like numerals are employed to designate like elements, numeral 5 indicates a stamped sheet metal casing body comprising a flat V-shaped side wall 6 and a pair of sides 7 extending integrally outwardly in the same direction from the V-edges of wall 6. The converging ends of the sides 7 terminate in parallel tabs 8 between which is disposed, and firmly secured by rivets 9, one end of a bi-metallic element 11.

The free longitudinal edges of sides 7 are provided with spaced integral ears 12. A flat closure plate 13, V-shaped substantially like the side wall 6 and parallel thereto, covers the opening between the sides 7 and is provided with slots 14 through which the ears 12 are projected and bent over upon the outer surface of plate 13 to detachably lock the latter in position to complete the casing structure.

The sharp end of the casing has its walls and cover perforated as at 15 to permit circulation over the bi-metallic element of the medium whose temperature is to be measured. In the position illustrated the element 11 is straight with its free end abutting a stop projection 16 at substantially atmospheric temperature (that is, a temperature substantially above freezing). At lower temperatures the bi-metal strip flexes away from the stop 16 towards the left in Figure 1. This particular design is for use in refrigerators and the like and, as should be well understood, can readily be modified where it is desired to measure temperatures above atmospheric. The disposition of the figures in the drawing is only relative and for purposes of illustration, it being preferable in actual practice (as will be seen later in connection with Figure 4) to arrange the instrument with its longitudinal axis horizontal and with its bi-metallic element below the stop 16. For convenience of description, however, the relative disposition of the views upon the drawing will hereafter be assumed when referring to the various parts.

A horizontal partition 17 divides the casing into two parts, one for housing the bi-metal strip and the other for housing the movement of the instrument. This partition is provided with a narrow slot 18 to permit mechanical interconnection of the element 11 and the movement now to be described. The slot is of very slight area in order to minimize the amount of possibly corrosive air and vapors that may gain access to or circulate through that portion of the casing which houses the movement.

Just above the partition 17 a special flat plate 19 of irregular contour is firmly mounted on the side wall 6 by means of a pair of machine screws 21 which pass through the plate and are threaded into a pair of bosses 22 die-formed integrally with the wall 6. A second plate 23, of stocking shape, is spaced from plate 19 in parallelism therewith by a pair of sleeves 24, and maintained in such relationship by a pair of long screws 25 which pass through the plate 23 and the sleeves 24 and have their ends threaded into the other plate 19. This special framework provides a rigid support for mounting a plurality of operable elements to permit freedom of movement thereof, without binding at all times, as follows:

The lower ends of the plates 19 and 23 provide bearings for the corresponding ends of a horizontal spindle 26 upon which is mounted, for oscillation therewith, a toothed segment 27. The lower end of segment 27 has an integral tail 28 which projects through the partition slot 18 into free sliding engagement with the upper end of the bi-metallic element. The upper or toothed end of the segment meshes with the teeth of a small pinion 29 that is secured to a rotatable shaft 31. One end of the pinion shaft 31 is borne by plate 19 and the other end is journaled through plate 23 and projects therebeyond to a point adjacent the casing cover 13. An L-shaped indicator, comprising a radial arm 32 parallel to the cover 13 and a pointer 33 formed by bending a portion of arm 32 at right angles to itself, is mounted upon shaft 31 for oscillation therewith by a securing assembly 34. The pointer 33 is parallel to shaft 31 and is of such length that it may oscillate freely in a cylindrical path in the widest portion of the V or fan-shaped casing. A coiled hairspring 30 surrounds the shaft 31 and reacts between the latter and the supporting framework to urge the shaft to move in a counterclockwise direction in Figure 1, thus tending to maintain the segment tail in contact with the bi-metal strip at all times.

Immediately below the cylindrical path just referred to, the sides 7 of the casing are slit to permit some of the metal to be pushed inwardly to provide a pair of supporting projections 35 and a corresponding pair of openings 36. The ends of a cylindrically curved strip 37 are supported on the projections 35. The width of this strip is less than the thickness of the casing in order to permit unrestricted oscillation of arm 32. Centrally and longitudinally of the strip 37 the latter is shaped to form an elongated protuberance 38 over which the pointer 33 is adapted to oscillate. This protuberance may be colored to simulate the liquid of a bulb type thermometer, and preferably is divided, as shown, into two colored portions, viz., a red portion for indicating undesirable or dangerous temperatures and a green portion for indicating safe or desirable temperatures. A second dial-forming strip 39 is superimposed upon strip 37 and is slotted as at 41 to receive the protuberance 38. A further slot 42 is provided to permit oscillation of the arm 32 therein. Tabs 43 are formed on the ends of strip 39, these tabs being inserted through the casing openings 36 and bent against the casing walls to firmly secure both strips in their illustrated positions. It may be found desirable to place various indices upon the surface of strip 39 adjacent the protuberance for the purpose of directing attention to a certain temperature condition as the pointer registers with each one of said indices. For example, when the device is used on a refrigerator, these indices may consist of such words as "Temperature too high" (opposite the red protuberance) and "Food safe" (opposite the green protuberance).

The diverging ends of the casings sides 7 are bent outwardly to form a pair of flanges 44 in a plane normal to the longitudinal center line of the instrument. A curved piece of transparent glass 45 is disposed between these flanges with its side edges supported upon the upper curved edges of the casing wall 6 and the cover 13 above the pointer 33. A rectangular frame or bezel 46 is disposed upon the upper surface of the glass, and both glass and bezel are secured in position by a specially shaped end cap 47 which closes the flaring end of the casing and has a pair of attachment brackets 48 each of which is provided with a pair of locking tabs 49 that cooperate with the flanges 44 to retain the cap in position. The upper face of cap 47 and the bezel 46 are provided with coincident rectangular openings, as at 51, in order that the dial 39, the protuberance 38, and the pointer 33 may be viewed through the glass from without the instrument.

In Figure 4 the instrument is shown in use on a refrigerator 52, with its casing projecting rearwardly into the refrigerating chamber and with its cap 47 fitted flush against the outer surface of the refrigerator. The device is arranged with the protuberance 38 in vertical position and the red portion thereof above the green. The pointer 33 thus is always horizontal as it swings vertically past the protuberance, and gives an unmistakable indication of the temperatures within the refrigerator, rising pointer indicating rise of temperature and vice versa. In this particular arrangement operation of the mechanism is as follows:

In the illustrated position the refrigerating chamber is substantially at atmospheric temperature. However, when ice is placed in the refrigerator or the mechanical refrigerating system, if one, (not seen) is placed in operation, the temperature gradually decreases, thus causing the free end of the bi-metallic element to flex away from the abutment 16. This permits the segment tail 28 to move in the same direction, and therefore permits the indicating arm to swing its pointer 33 downwardly from the red to the green portion of the protuberance 38 in response to the torque exerted by hairspring 30. This torque is augmented by the gravitational swinging of the arm and pointer, which pendulum action renders the indication accurate by maintaining the segment tail in positive contact with the bi-metallic element at all times.

Should the temperature rise within the box to a point where food deterioration begins (as represented by the dividing line between the red and green protuberances), due to an exhausting ice supply, or to improper regulation or breakdown of the mechanical refrigerating system, the bi-metal strip will move toward its abutment 16, positively oscillating the segment 27 through its tail 28 and thereby causing positive actuation of the pinion 29, shaft 31, arm 32 and pointer 33. The pointer then cooperates with the upper portion of the protuberance and dial to give the housewife or attendant an immediate plainly visible warning, whereupon she may replenish the ice supply (or readjust the "cold control" if the refrigeration is mechanical).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What I claim and desire to secure by U. S. Letters Patent is:—

1. An elongated temperature indicating instrument comprising a substantially wedge-shaped casing designed to have its interior subjected to the temperature to be measured; temperature-responsive means mounted in the converging end of said casing; mechanism mounted within the casing and associated with said temperature-responsive means to be actuated in response to movement thereof; said mechanism including a swinging indicator having a pointing portion thereof designed to oscillate in a fixed path of cylindrical curvature at the diverging end of said casing; and means supported at said diverging end for cooperating with said pointing portion to render the latter effective to indicate the temperature conditions within the casing when looking toward said diverging end in a direction longitudinally of the casing.

2. In the instrument defined in claim 1, said temperature-responsive means comprising a bi-metallic element clamped at one end in the converging end of the casing and having its free end projecting in proximity to said mechanism; means operably interconnecting said mechanism with the free end of said element; and a partition in the casing between said mechanism and said element, said partition having an opening therein to permit movement of said interconnecting means.

3. In combination, a temperature-responsive device and means for mounting the same; a movement operably associated with said device; means for supporting said movement; said movement including a shaft and an indicator mounted on said shaft to swing about the axis thereof; said indicator having a pointer that is always parallel to said axis; and stationary means disposed adjacent said pointer and so mounted that the pointer may move over it to indicate relative temperature conditions; said last-mentioned means comprising a strip of material adjacent said pointer in parallel relation to the path of movement of the latter, and divided into visibly different protuberant portions one of which cooperates with the pointer to indicate desirable temperatures and another of which cooperates with said pointer to indicate undesirable temperatures.

4. In combination, a temperature-responsive device and means for mounting the same; a movement operably associated with said device; means for supporting said movement; said movement including a shaft and an indicator mounted on said shaft to swing about the axis thereof; said indicator having a pointer that is always parallel to said axis; and means disposed adjacent said pointer and so mounted that the pointer may move over it to indicate relative temperature conditions; said last-mentioned means comprising a dial consisting of two contacting parts arranged under and in parallel relation to the path of movement of said pointer, one of which parts is provided with end tabs; and said supporting means for the movement including a casing having slots for receiving said end tabs, and inward projections adjacent said slots for abutting the edges of the other part of said dial to maintain the latter in position.

5. A thermometer comprising a temperature indicating means; mechanism for actuating said indicating means; a temperature-responsive member mounted with one end free to move through a space adjacent said mechanism; said mechanism including an element separably engaging said free end of the temperature-responsive member, means for maintaining said element and said member in yielding contact, whereby said element follows said member in one direction of movement and is positively actuated by said member in the opposite direction of movement; and means providing a stop for limiting the travel of said member in said opposite direction of movement.

6. A thermometer adapted to be inserted in the wall of a refrigerator or the like, comprising a casing of substantially the same shape as a radial segment of a cylinder, said casing being adapted to be mounted with its longitudinal axis normal to said wall, with its convergent end projecting into said refrigerator and with its divergent end substantially flush with the outer surface of said wall; a dial assembly vertically mounted in said divergent end and provided with upper and lower markings to designate undesirable and desirable temperatures; a movement including an indicator having a movable pointer horizontally disposed adjacent the outer surface of said dial assembly; an elongated temperature-responsive element disposed within said casing with one end mounted in the convergent end of the latter, and its other end in engagement with said movement to actuate the latter, in response to temperature variations within the refrigerator.

7. In combination, a one-piece casing having three sides two of which are substantially normal to the third and converge substantially into engagement with each other to form one end of the casing, the opposite end of the casing being open; a temperature-responsive element disposed between said converging ends and united thereto; a cover plate adapted to fit upon said casing substantially in parallelism with said third side; means carried by said two normal sides for maintaining said cover in position; and a cap assembly for closing said open end of the casing, said assembly including a cap attached to said two normal sides of the casing and having a transparent opening designed to permit temperature observations.

8. An elongated temperature indicating instrument comprising a long narrow casing designed for projection through a relatively thick wall or the like; temperature-responsive means mounted in one end of said casing; mechanism mounted within the casing and associated with said temperature-responsive means to be actuated in response to movement of the latter; said mechanism including an indicator having a portion thereof designed to move in a fixed path at the other end of said casing and laterally thereof; and a dial assembly mounted at said other end of the casing; said assembly being designed for substantially flush disposition relative to said wall or the like, and embodying means substantially parallel to said indicator portion for cooperation with the latter to render temperature readings, whereby temperature conditions are viewed by looking directly at said dial assembly in a direction longitudinally of the instrument.

9. For use in combination with the wall of a refrigerator or other housing containing fluid at varying temperatures, an elongated casing of relatively slight cross sectional area at one of its ends; said casing being designed for projection through said wall, with its longitudinal axis normal to the latter, and with its said one end projecting beyond the wall into said fluid and its other end substantially flush with the outer surface of the wall; a temperature-responsive element mounted in the small inner end of said casing; a dial assembly mounted at the outer end of said casing in substantially parallel flush relation to the outer surface of the wall, said assembly being provided with markings to designate undesirable and desirable temperatures; and means associated with said temperature-responsive element and said dial assembly to transmit temperature responses of the former in readable form to the markings of the latter, whereby heat conditions behind the wall can be easily observed along a line of sight perpendicular to the wall.

PAUL GAISER.